March 14, 1933.  A. DINA  1,900,919
COMBINED VENTILATING AND FIRE SHUTTER FOR
MOTION PICTURE PROJECTION MACHINES
Filed June 29, 1929   2 Sheets-Sheet 1
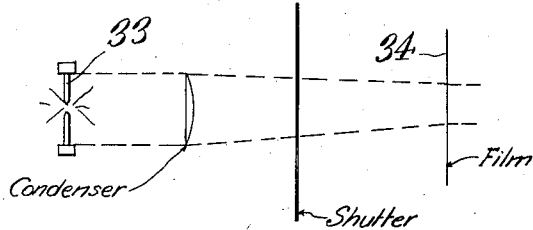
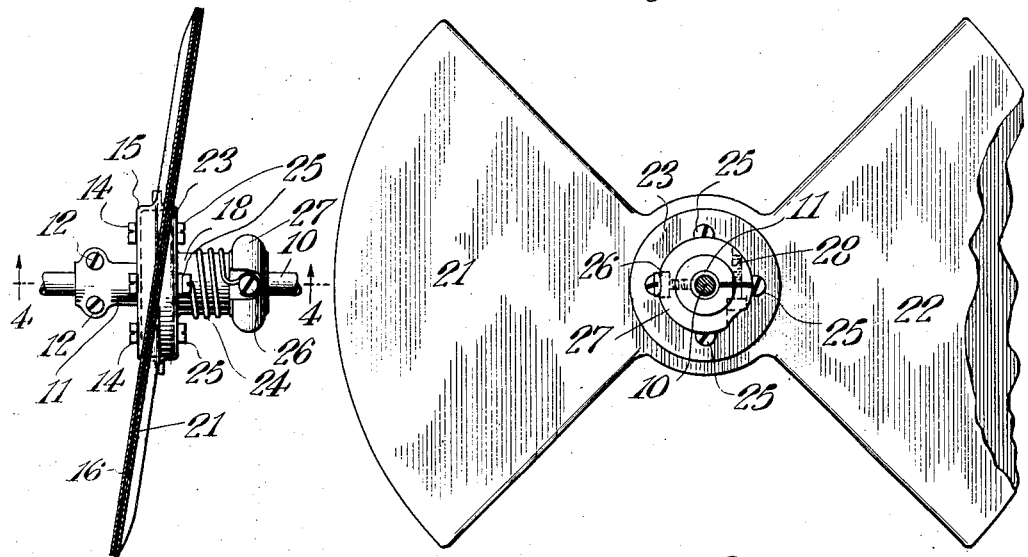
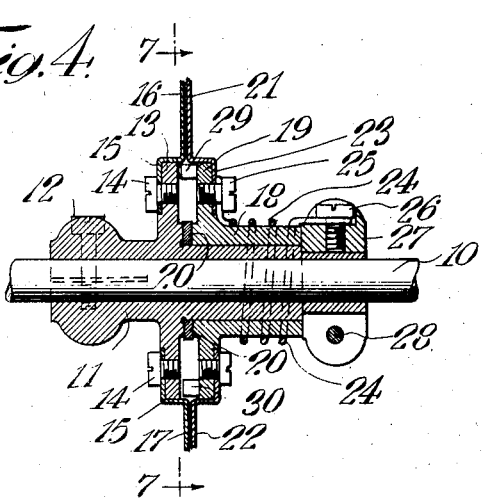
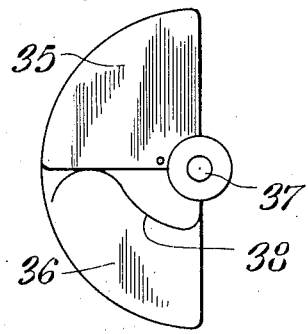
INVENTOR
Augusto Dina
BY
Howard W. Dix
ATTORNEY March 14, 1933.                     A. DINA                    1,900,919
              COMBINED VENTILATING AND FIRE SHUTTER FOR
                 MOTION PICTURE PROJECTION MACHINES
                      Filed June 29, 1929        2 Sheets-Sheet 2
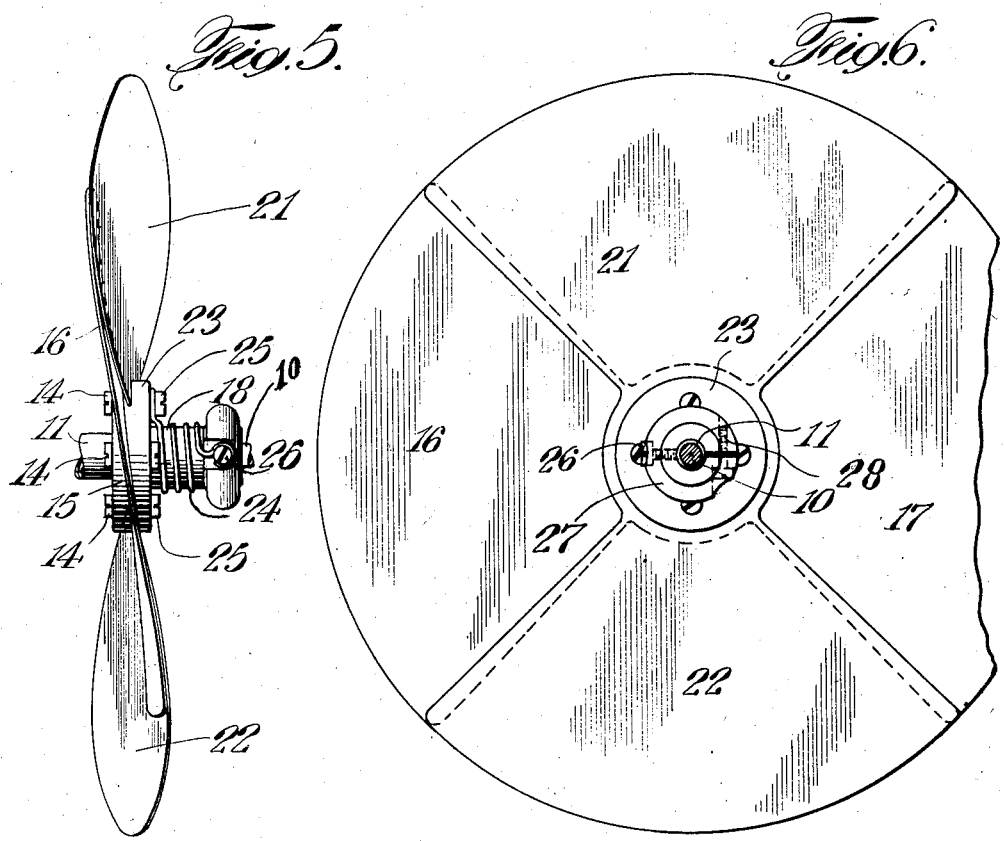
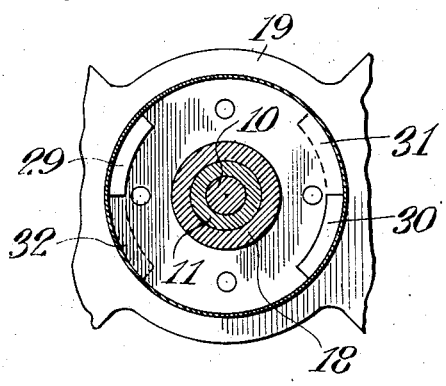
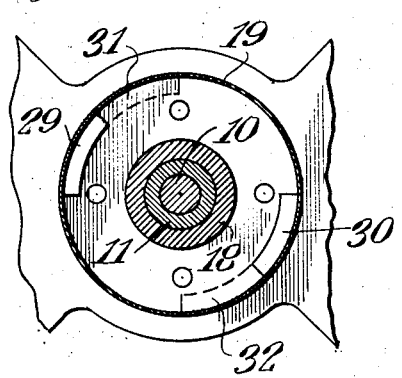
INVENTOR
Augusto Dina
BY
Howard W. Dix
ATTORNEY Patented Mar. 14, 1933

1,900,919

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

COMBINED VENTILATING AND FIRE SHUTTER FOR MOTION PICTURE PROJECTION MACHINES

Application filed June 29, 1929. Serial No. 374,739.

This invention relates to motion picture apparatus and particularly to shutters therefor with especial reference to a combined ventilating and fire shutter.

A main object of the invention is to provide a simple, compact, durable, and efficient device which, when in operation and running, will act in the usual manner as a motion picture machine shutter, but which, when it is stopped for any reason or running below a predetermined speed, is so constructed that its elements will automatically assume positions in which the shutter acts effectively as a fire screen especially when disposed between the source of light and the film.

Further and more specific objects, features, and advantages will more clearly appear from the detailed description given below when taken in connection with the accompanying drawings which form part of the specification and which illustrate one preferred embodiment of the invention.

Considered broadly, the invention concerns a rotatable shutter, preferably but not necessarily, disposed between the source of the projection light and the film and comprising a plurality of relatively moveable blades. When the shutter is at rest or running below a certain minimum speed, the blades are caused by suitable means to assume such a relative position that they completely prevent the light from reaching the film no matter what the position in which the shutter comes to rest. When the shutter is rotating, the wind resistance on at least one of the blades causes the relatively moveable blade or blades to be moved against the resistance of the above mentioned means so that the moveable blade or blades proceed to a position lapped-over or nesting against the other blade, so that the usual shutter openings are formed and the shutter will function in the usual manner.

A preferred embodiment of the invention is shown in the drawings, of which,

Fig. 1 is a diagrammatical view of one preferred position in which a shutter may be used;

Fig. 2 is a side elevation of the shutter blades in their nested position;

Fig. 3 is an end elevation of the shutter as viewed from the right in Fig. 2;

Fig. 4 is a section taken on the line 4—4 of Fig. 2;

Fig. 5 is a side elevation of the shutter blades in the open or screening position;

Fig. 6 is an end elevation of the shutter as shown in Fig. 5;

Fig. 7 is a transverse section taken on the line 7—7 of Fig. 4, showing the stop members in one extreme position;

Fig. 8 is a similar section showing the stop members in their opposite extreme position; and, Fig. 9 is a somewhat diagrammatic view of a modified form of the invention.

As shown in the drawings, the present preferred form of the invention comprises a shutter shaft 10, to which is fastened a split sleeve-like hub 11 by means of screws 12. This hub 11 near one end has a circular, preferably integrally formed flange 13 to which, by means of screws 14, a shutter blade 15 is fastened. This blade is bent, as shown, at an angle to the plane normal to the axis of rotation of the shaft 10 and is composed of two oppositely extending blade portions 16 and 17 as seen in Figs. 4 and 6. These portions may be formed integral or may be separate elements fastened to the flange 13. By bending these blades, the shutter, in rotation, acts as a fan to ventilate the head and the film of the projector and keep it cool. The space between the blade portions 16 and 17 form the usual shutter openings through which the light passes to the film.

As shown in Fig. 4, a second sleeve 18, is rotatably mounted on hub 11 and also provided with a circular flange 19 parallel to but spaced from the flange 13 by means of a spacing ring 20. To this flange 19 is fastened the opposite blade portions 21 and 22 of another blade element 23 and these portions are bent at an angle to the axis of rotation similar to that at which the portions 16 and 17 are bent. The similarity of the angle at which the blade portions are bent permits the two blade elements to lie nested or overlaid closely as shown in Fig. 2 which is the position they assume when the shutter is in running operation. Since the portions 21 and 22 are mounted on a freely rotatable hub or sleeve 18, as soon as the shutter commences to rotate, the wind resistance on the portions 21 and 22 will cause them to assume the position shown in Fig. 2, against the resistance of a spring 24 one end of which is fastened to the flange 19 beneath one of the screws 25, and the other end of which is fastened beneath the head of a screw 26 on a collar 27 which is preferably a split collar fastened to the outer end of the sleeve 11 by means of the clamping screws such as 28.

In the event the speed of rotation of the shutter shaft 10 drops below a certain minimum value or has stopped altogether, the spring 24 will dominate and act, since with the decrease of speed the wind force on the blade 23 decreases, and the blade 23 with its sleeve 18 will gradually move relatively to sleeve 11 until the blade 23 with its portions 21 and 22 occupy a position shown in Fig. 6 where they fill in the gaps ordinarily constituting the shutter light openings. Thus, in this position of the shutter blade elements, the shutter forms a complete screen or closure to the light from the source of light and, when disposed between the source of light and the film, will prevent the film from being set on fire when the shutter and the film stop. It will be observed that the angular width of the blade portions 16, 17, 21, and 22 are such that, in the screening position, they overlap so that no light can get through. It is to be understood that instead of the shutters having two blades each they may have three or more blade portions each. It is preferred that the two extreme open and closed positions of the shutter blade elements be determined and defined by means of suitable stop members on the adjacent faces of the flanges 13 and 19. On the face of the flange 13 are two stop members such as 29 and 30 whereas on the adjacent face of the flange 19 are two stop members such as 31 and 32. These members are in the form of projecting dogs or lugs which, as the flange 19 moves angularly with respect to the flange 13, will come in contact with each other and stop further movement in one direction or another.

As shown in Fig. 7 the stop members are in the position of contact assumed when the blade portions are disposed as shown in Fig. 2 and in Fig. 8 the stop members are in the position assumed when the blade portions are in the position shown in Fig. 6.

As shown in Fig. 1 this type of shutter is preferably used when it is to be disposed between the source of light 33 and the film 34, especially in view of the intense heat of the modern lamps and arcs now employed. Therefore whenever the shutter is moving, the usual openings are provided but when its speed ceases or is reduced below a predetermined minimum, then the spring will move the blade 23 to the screening position so that the light will not impinge upon the film and thus the shutter will act as a fire screen or shutter, as well as a fan for the ventilation of the film and the head. After the parts are once set and adjusted, the action, it will be obvious, is entirely automatic and will require no particular attention on the part of the operator.

In the Fig. 9 is illustrated a form of the invention in which the relatively movable blade portion 35 is pivotally mounted on the blade portion 36 fastened to the shutter shaft 37, and is held in its screening position by means of the spring 38. This form is diagrammatically shown to indicate that the blade portions need not all be mounted on the shutter shaft and that their mounting is immaterial so long as they effectively nest in one position and close the shutter openings when in the other position.

While the invention has been described in detail and with respect to a preferred form thereof, it is not to be limited to such details and forms since many changes and modifications may be made and the invention embodied in other forms without departing from the spirit and scope of the invention in its broader aspects. Hence it is desired to cover all forms and modifications which may come within the language and scope of any one or more of the appended claims.

What is claimed, is:

1. A combined ventilating and fire shutter for motion picture machines which comprises a rotatable multi-bladed shutter, substantially the entire area of the blades of the shutter disposed at an angle to the plane normal to the axis of rotation to act as a fan, a second multi-bladed shutter moveable with respect to the first shutter with substantially the entire area of its blades disposed at an angle to the plane normal to the axis of rotation, means connecting the second shutter with the first to keep it in position to close the openings between the blades of the first shutter when it is stopped or moving below a predetermined speed, the second shutter, when the first shutter is moving above said predetermined speed, being moved against the resistance of said means by the force of the air against the angularly disposed blades thereof, to a position in alinement with the blades of the first shutter.

2. A combined ventilating and fire shutter for motion picture machines which comprises a multi-bladed shutter rotatable with a shutter shaft and with substantially the entire area of its blades disposed at an angle to the plane normal to the axis of rotation, a second multi-bladed shutter moveable with respect to the first shutter and with substantially the entire area of its blades disposed at an angle to the plane normal to the axis of rotation, said second shutter having a plurality of operative positions with respect to the first shutter, means for stopping the second shutter in its operative positions, said second shutter moveable to one of its operative positions by the force of the air when the shutters are rotating, and means for moving the second shutter to another of its operative positions when the shutters stop or are moving below a predetermined speed.

3. A combined ventilating and fire shutter for motion picture machines which comprises a multi-bladed shutter rotatable with a shutter shaft, and with substantially the entire area of its blades disposed at an angle to the plane normal to the axis of rotation, a second multi-bladed shutter moveable with respect to the first shutter and with substantially the entire area of its blades disposed at an angle to the plane normal to the axis of rotation, said second shutter having two operative positions in one of which it is in position to fill in or close the openings between the blades of the first shutter, and in a second of which it is in alinement with the first shutter, the force of the air against the second shutter blades moving it to the second position, and a spring connecting the two shutters and adapted to move the second shutter to the first position when the shutters stop or move below a predetermined speed.

4. A combined ventilating and fire shutter for motion picture machines which comprises a rotatable multi-bladed shutter, a second multi-bladed shutter moveable with respect to the first shutter, said second shutter having a plurality of operative positions with respect to the first shutter, substantially the entire area of the blades of said shutters being disposed at the same angle to the plane normal to the axis of rotation.

5. A combined ventilating and fire shutter for motion picture machines which comprises a shutter shaft, a multi-bladed shutter disposed on and moveable with said shaft with substantially the entire area of its blades disposed at an angle to the plane normal to the axis of rotation, a second multi-bladed shutter moveable with respect to the first shutter, a spring connecting said shutters, substantially the entire area of the blades of the second shutter being disposed at the same angle as those of the first shutter to nest when they are alined, said spring moving the second shutter to a position to fill the openings between the blades of the first shutter when the shutters are stopped or moving below a predetermined speed, the force of the air against the blades of the second shutter moving it against the force of the spring into alinement with the blades of the first shutter when the shutters are moving above said predetermined speed and stops associated with both the shutters to stop the second shutter in its two extreme positions.

6. A combined ventilating and fire shutter for motion picture machines which comprises a shutter shaft, a multi-bladed shutter disposed on and movable with said shaft, a sleeve fastened to said shaft and on which said shutter is disposed, substantially the entire area of the blades of said shutter being disposed at an angle to the plane normal to the axis of rotation, a second sleeve loosely disposed around the first mentioned sleeve, a second multi-blade shutter disposed on said second sleeve adjacent the first shutter, a spring connected at one end to one sleeve and at the other end to the other sleeve, substantially the entire area of the blades of the second shutter being disposed at an angle to the plane normal to the axis of rotation, the angle of inclination of the blades of each shutter being the same, said spring disposed to hold the blades of the shutters alined when the shutter shaft is moving below a predetermined speed.

AUGUSTO DINA.